US012725562B2

(12) United States Patent
Srinivasan et al.

(10) Patent No.: US 12,725,562 B2
(45) Date of Patent: Sep. 1, 2026

(54) PERCEPTUAL PICTURE QUALITY IMPROVEMENT FOR POWER SAVING

(71) Applicant: Samsung Electronics Co., Ltd., Suwon-si (KR)

(72) Inventors: Aparajith Srinivasan, Irvine, CA (US); Chenguang Liu, Tustin, CA (US); Chang Su, Foothill Ranch, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 18/670,503

(22) Filed: May 21, 2024

(65) Prior Publication Data

US 2025/0174174 A1 May 29, 2025

Related U.S. Application Data

(60) Provisional application No. 63/603,586, filed on Nov. 28, 2023.

(51) Int. Cl.
*G09G 3/32* (2016.01)

(52) U.S. Cl.
CPC ....... *G09G 3/32* (2013.01); *G09G 2320/0242* (2013.01); *G09G 2320/066* (2013.01); *G09G 2320/0666* (2013.01); *G09G 2320/0686* (2013.01); *G09G 2330/023* (2013.01)

(58) Field of Classification Search
CPC ............. G09G 3/32; G09G 2320/0242; G09G 2320/066; G09G 2320/0666; G09G 2320/0686; G09G 2330/023; G09G 3/2003
See application file for complete search history.

(56) References Cited

U.S. PATENT DOCUMENTS

| | | | |
|---|---|---|---|
| 8,379,040 B2 | 2/2013 | Mori | |
| 8,791,953 B2 | 7/2014 | Kwon et al. | |
| 9,257,066 B2 | 2/2016 | Roh et al. | |
| 10,699,674 B2 | 6/2020 | Jeong et al. | |

(Continued)

FOREIGN PATENT DOCUMENTS

| | | |
|---|---|---|
| CN | 110473486 A | 11/2019 |
| KR | 1609255 | 4/2016 |
| KR | 10-2435903 B1 | 8/2022 |

OTHER PUBLICATIONS

High et al. The Helmholtz-Kohlrausch effect on display-based light colors and simulated substrate colors, Color Res Appl. 2023: 49: 167-177, Jan. 2023 (Year: 2023).*

(Continued)

*Primary Examiner* — Yingchun He
(74) *Attorney, Agent, or Firm* — Sherman IP LLP; Kenneth L. Sherman; Steven Laut

(57) ABSTRACT

One embodiment provides a computer-implemented method that includes increasing a chroma of one or more particular hues of an image for display on a display device. The one or more particular hues having at least a threshold magnitude of a visual perception effect based on a contrast between one or more colors and a background color. Perceptual brightness of the image is increased without changing actual brightness of the image. A lightness of at least one of two particular hues is reduced, by a specified amount, to increase global contrast between various hues.

20 Claims, 7 Drawing Sheets
(2 of 7 Drawing Sheet(s) Filed in Color)

(56) References Cited

U.S. PATENT DOCUMENTS

| | | | |
|---|---|---|---|
| 11,011,101 | B2 | 5/2021 | Zhang et al. |
| 2008/0049275 | A1 | 2/2008 | Hsu et al. |
| 2011/0128297 | A1 | 6/2011 | Ramanath |
| 2014/0078198 | A1 | 3/2014 | Roh et al. |
| 2014/0092122 | A1 | 4/2014 | Sano et al. |
| 2014/0225933 | A1 | 8/2014 | Park et al. |
| 2017/0110071 | A1 | 4/2017 | Ando |
| 2023/0095724 | A1 | 3/2023 | Lachine |

OTHER PUBLICATIONS

International Search Report and Written Opinion dated Nov. 26, 2024 for International Application PCT/KR2024/012698, from Korean Intellectual Property Office, pp. 1-10, Republic of Korea.

Extended European Search Report dated Apr. 29, 2026 for European Application No. 24897816.5 from European Patent Office, pp. 1-12, Munich, Germany.

* cited by examiner

```
total_light_factor        = light_factor 1* light_factor2
L = L * (1 - total_light_factor)
a  = clip(a * sat_factor, -128, 127)
b  = clip(b * sat_factor, -128, 127)
```

PERCEPTUAL PICTURE QUALITY IMPROVEMENT FOR POWER SAVING

CROSS-REFERENCE TO RELATED APPLICATIONS

This application claims the priority benefit of U.S. Provisional Patent Application Ser. No. 63/603,586, filed on Nov. 28, 2023, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to display imaging enhancement, and in particular, to providing enhancement of perceived contrast associated with an input image.

BACKGROUND

Power and energy conservation is crucial in today's world as we rely heavily on non-renewable energy. In addition, saving power is also key in reducing the overall electricity costs in rural and urban settings. Nowadays, almost everyone has a television (TV) or mobile phone, and one of the main components in these devices that contributes to power consumption is the display. With different types of displays such as Organic light emitting diode (OLED), Quantum dot LED (QLED) and so on emerging in the imaging space, one is able to witness crystal clear images with super high resolutions. Advancements in image processing has led to various enhancement techniques, which make the image vivid with high contrast as well. Many of these, however, have also led to increases in power consumption with the tradeoff in viewing better images. The most naïve way to save power is to reduce the backlight of the TV, but this is not visually appealing.

SUMMARY

One embodiment provides a computer-implemented method that includes increasing a chroma of one or more particular hues of an image for display on a display device. The one or more particular hues having at least a threshold magnitude of a visual perception effect based on a contrast between one or more colors and a background color. Perceptual brightness of the image is increased without changing actual brightness of the image. A lightness of at least one of two particular hues is reduced, by a specified amount, to increase global contrast between various hues.

Another embodiment includes a non-transitory processor-readable medium that includes a program that when executed by a processor provides increasing global contrast between various hues that includes increasing, by the processor, a chroma of one or more particular hues of an image for display on a display device. The one or more particular hues having at least a threshold magnitude of a visual perception effect based on a contrast between one or more colors and a background color. The processor further increases perceptual brightness of the image without changing actual brightness of the image. The processor additionally reduces, by a specified amount, a lightness of at least one of two particular hues to increase global contrast between various hues.

Still another embodiment provides an apparatus that includes a memory storing instructions, and at least one processor executes the instructions including a process configured to increase a chroma of one or more particular hues of an image for display on a display device. The one or more particular hues having at least a threshold magnitude of a visual perception effect based on a contrast between one or more colors and a background color. The process is further configured to increases perceptual brightness of the image without changing actual brightness of the image. The process is additionally configured to reduce, by a specified amount, a lightness of at least one of two particular hues to increase global contrast between various hues.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

Some embodiments relate generally to display image enhancement, and in particular to providing increasing global contrast between various hues. One embodiment provides a computer-implemented method that includes increasing a chroma of one or more particular hues of an image for display on a display device. The one or more particular hues having at least a threshold magnitude of a visual perception effect based on a contrast between one or more colors and a background color. Perceptual brightness of the image is increased without changing actual brightness of the image. A lightness of at least one of two particular hues is reduced, by a specified amount, to increase global contrast between various hues.

Figure 1C:
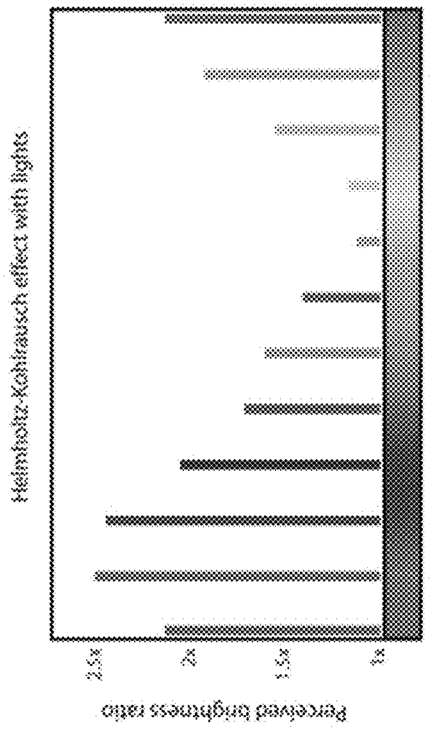
FIG. 1C illustrates an example graph of magnitude of PP effect with fully saturated monochromatic light.
Figure 1A:
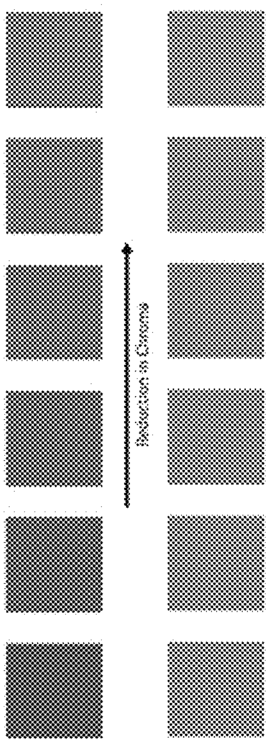
FIG. 1A illustrates an example of chroma versus lightness.

FIG. 1A illustrates an example of chroma versus lightness. In some embodiments, the disclosed technology provides a process or algorithm to enhance the perceived color of input content based on a perceptual phenomenon (PP; e.g., a Helmholtz-Kohlrausch (HK)) effect. In one or more embodiments, the disclosed technology provides a modeling of the PP effect for perceived color improvement while preserving and/or reducing power consumption at the same time. The PP effect, such as an HK Effect, etc., is a visual phenomenon in which the saturation of the color is perceived as a part of the color's luminance. In other words, the lightness perceived by the eyes increases with increase in chroma, even though the physical lightness is preserved. FIG. 1A shows an example of this. The top row represents the color red with different chroma. It is very evident that higher the chroma, the perceived lightness (or commonly, brightness) is increased. However, the actual lightness (second row) remains the same throughout.

Figure 1B:
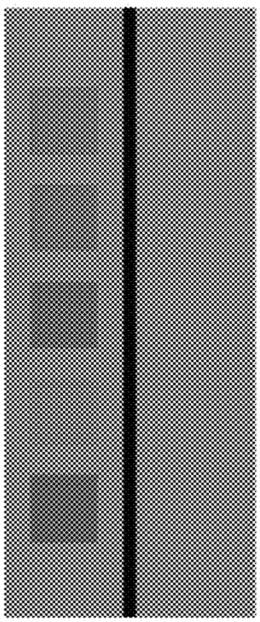
FIG. 1B illustrates an example of a perceptual phenomenon (PP) effect with different hues.

FIG. 1B illustrates an example of an PP effect with different hues. The PP effect is dependent on the hue. Not all colors exhibit an equal PP effect, as can be seen in the example of FIG. 1B. Each color on the top row has the same luminance level, yet they do not look equally bright. When all of these are converted to gray scale (second row), they all look the same.

FIG. 1C illustrates an example graph of magnitude of PP effect with fully saturated monochromatic light. In some embodiments, the disclosed technology can include (i.e., but is not limited to) a process/algorithm to enhance the perceived color of input content based on the PP effect.

Figure 2C:
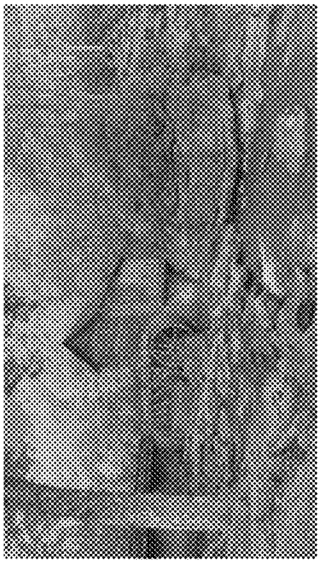
FIG. 2C illustrates an example of a power saving image with the PQ reduced from the input image of FIG. 2A.
Figure 2B:
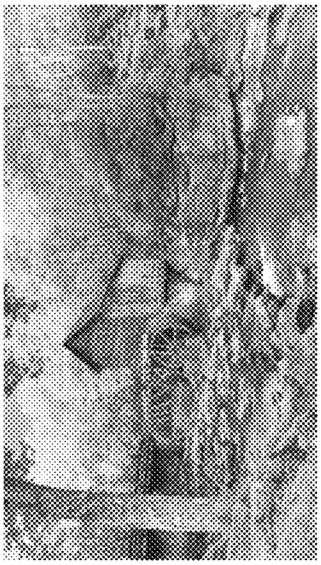
FIG. 2B illustrates an example picture quality (PQ) improved image that consumes more power than the input image of FIG. 2A.
Figure 2A:
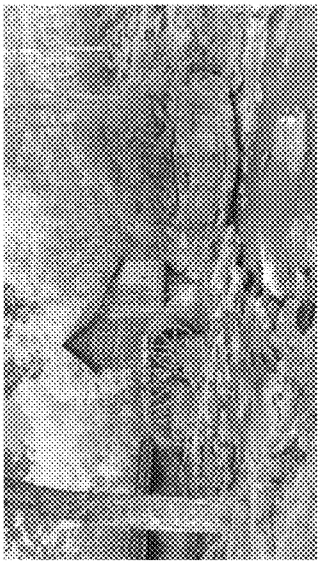
FIG. 2A illustrates an example input image.

FIG. 2A illustrates an example input image. FIG. 2B illustrates an example picture quality (PQ) improved image that consumes more power than the input image of FIG. 2A. FIG. 2C illustrates an example of a power saving image with the PQ reduced from the input image of FIG. 2A. PQ improvement and power conservation are two contradictory tasks in most cases. As shown in the example of FIG. 2B, enhancing the input image can make the image brighter, which leads to more power consumption. On the other hand, in the example of FIG. 2C, the power is saved with a dimmed image, but the quality is reduced. In some embodiments, the disclosed technology can find a middle ground in picture quality improvement by preserving and/or reducing the power consumption at the same time.

Figure 3:
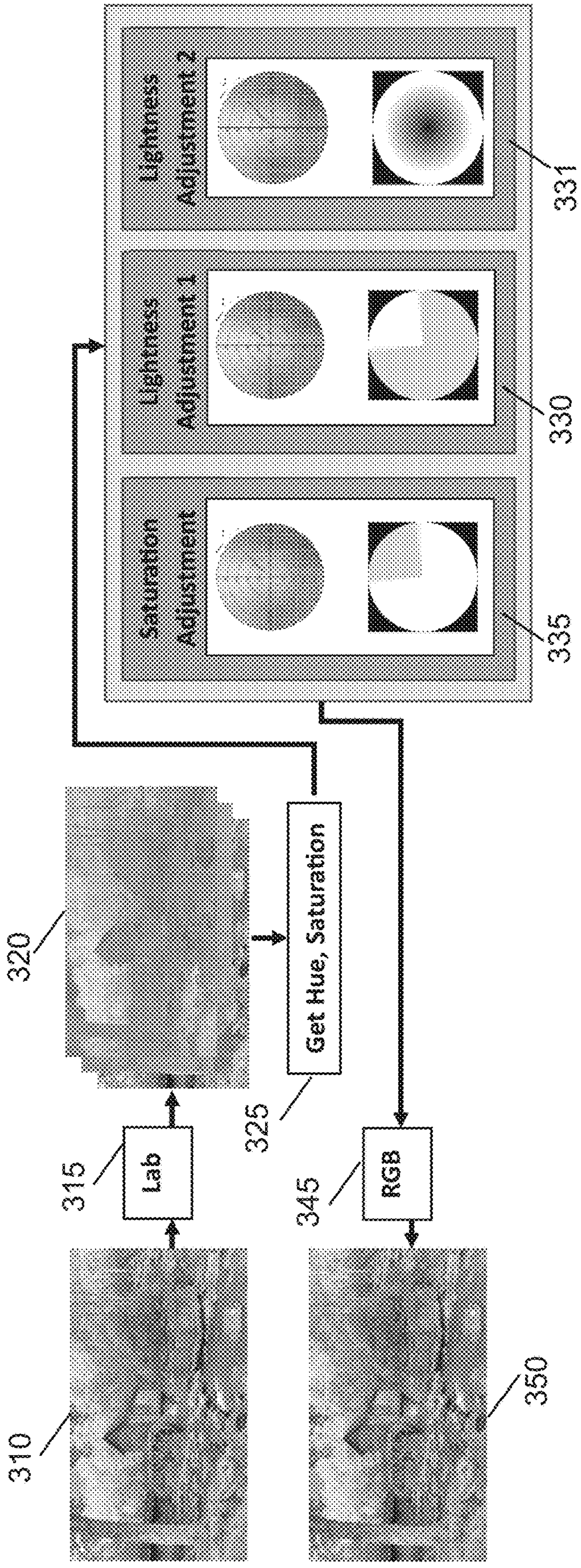
FIG. 3 illustrates an overview of a PP Effect-based power saving PQ flow diagram, according to some embodiments.

FIG. 3 illustrates an overview of a PP Effect-based power saving PQ flow diagram, according to some embodiments. In one or more embodiments, the disclosed technology may not require any high computational deep learning methods and can only rely on point processing. In some embodiments, taking insights from the PP effect, the disclosed technology can increase the chroma of hues such as magenta, violet and blue, which have a high magnitude of an PP effect. However, to preserve skin tone in the image, the disclosed technology can leave red and yellow unchanged. This increases the perceptual brightness of the image without changing the actual brightness. In one or more embodiments, to increase the global contrast between hues, the disclosed technology can reduce the lightness of red and yellow by a small amount. This not only helps in saving power, but also helps in enhancing the image. In some embodiments, another process that can be performed to save power is to reduce the lightness of high saturated colors. According to the PP effect, reducing the lightness of high saturated colors may not cause significant change in perceptual brightness. In one or more embodiments, these computations can be performed in the CIELAB (the CIELAB color space, also referred to as L*a*b*, is a color space defined by the International Commission on Illumination (abbreviated CIE) and expresses color as three values: L* for perceptual lightness and a* and b* for the four unique colors of human vision: red, green, blue and yellow) space where the hues are perceptually linear. However, any color space which separates the hue, saturation and lightness can be used, for example, Hue, Saturation, Value (HSV), and the equations and computations will change accordingly.

In one or more embodiments, the input image 310 is converted from the RGB (Red, Green, Blue) color space to the CIELAB (Lab) color space in block 315. The result from block 315 is the image 320 reflecting the three channels of the CIELAB color space: L for lightness, a for the red-green hue values, and b for the blue-yellow hue values for each and every pixel. The Lab image is input to block 325 that obtains hue and saturation information from the Lab channels. The hue information is input to block 330 and block 335 for lightness adjustment 1 processing and saturation adjustment processing respectively. The saturation information is input to block 331 for lightness adjustment 2. The results of blocks 330, 331 and 335 are converted to the RGB color space in block 345, resulting in the output image 350. Further details are as follows.

In some embodiments, from the CIELAB values, the processing can derive the hue, chroma and saturation as given below.

$$\text{hue} = \tan^{-1}\left(\frac{b}{a}\right)$$

$$\text{chroma} = \sqrt{a^2 + b^2}$$

$$\text{saturation} = \frac{\text{chroma}}{\sqrt{\text{chroma}^2 + L^2}}$$

From the equations, it can be seen that increasing the chroma also leads to increase in saturation for a given lightness. Hence the processing can increase chroma (and in turn saturation) to increase the perceptual brightness of the image without actually making the image brighter for power saving.

According to the PP effect, perceptual brightness increases with saturation. Hence, in one or more embodiments the processing can increase the saturation (by increasing chroma) of some hues to make the image look brighter without actually making it brighter. Some embodiments can focus more on increasing the saturation of the hues of magenta, violet, and blue as these have a higher magnitude for PP effect. Even though green does not have a relatively higher PP effect, the processing can still increase the saturation to make the green colored regions perceptually brighter. However, in some cases, the processing does not need to change the saturation of red-yellow as they attribute to skin-tone. In one or more embodiments, the weighting function for increasing the saturation is smooth in-order to avoid banding artifacts.

Figure 4:
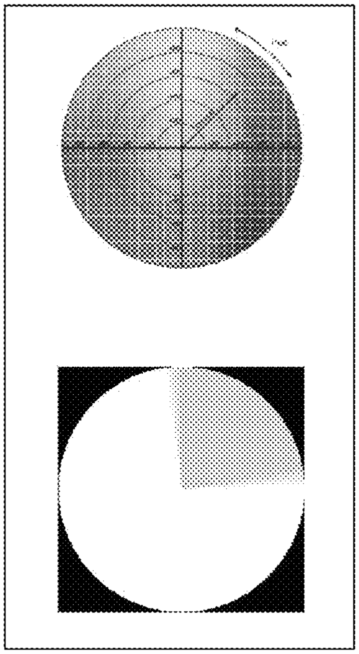
FIG. 4 illustrates an example of saturation weighting according to hue, according to some embodiments.

FIG. 4 illustrates an example of saturation weighting according to hue, according to some embodiments. As shown, the example provides how the processing (FIG. 3) changes the saturation with respect to the hues. The bottom circle is the weighting circle. The white portion denotes a higher weight (e.g., 1.25 in this case) and the gray portion denotes a lower weight (e.g. 1 in this case). This weight can be a multiplication factor and hence, the hues apart from red and yellow can have an increase in saturation. In some embodiments, the change from 1 to 1.25 and vice-versa is smooth and happens across, for example, 10 degrees. In one or more embodiments, the saturation adjustment function is shown as follows. The saturation adjustment function takes in the hue value and outputs the saturation increase value as follows:

sat_factor=saturation_adjust(Hue)

where sat_factor belongs in the range [1, 1.25].

In the previous processing the system maintains red-yellow unchanged to preserve the skin-tone color. In this processing, the system can reduce the lightness of red-yellow colors. Combining with increasing the saturation of the other colors, this processing can increase the global contrast of the image. Red has a high PP effect magnitude and hence, this processing may not perceptually affect red as much. Yellow has a low PP effect magnitude, and this processing can also reduce the perceptual brightness of yellow. However, due to overall increase in contrast between colors in the processing, this reduction in yellow even though visually perceived, may not decrease the picture quality.

Figure 5:
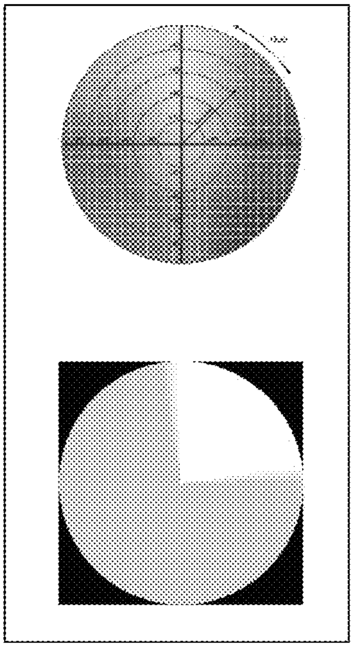
FIG. 5 illustrates an example of lightness weighting according to hue, according to some embodiments.

FIG. 5 illustrates an example of lightness weighting according to hue, according to some embodiments. As shown, the example provides how the processing (FIG. 3) changes the lightness with respect to the hues. As shown, the weighting circle is now inverted from that of FIG. 4 corresponding to more reduction in lightness for red-yellow hues. The weight value in this case is varied, for example, from the range [1, 1.1] but like the previous processing, this value is not just multiplied with the L channel. Here, a higher value corresponds to more reduction in lightness. In some embodiments, the lightness adjustment function takes in the hue value and outputs the lightness reduction value as follows:

light_factor1=lightness_adjust1(Hue)

where light_factor1 belongs in the range [1, 1.1].

Figure 6:
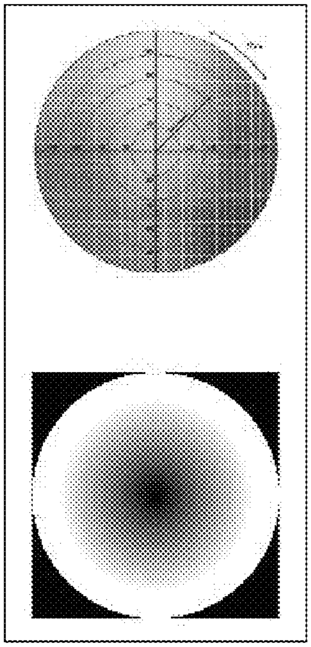
FIG. 6 illustrates an example of lightness weighting according to saturation, according to some embodiments.
Figures 7, 8:
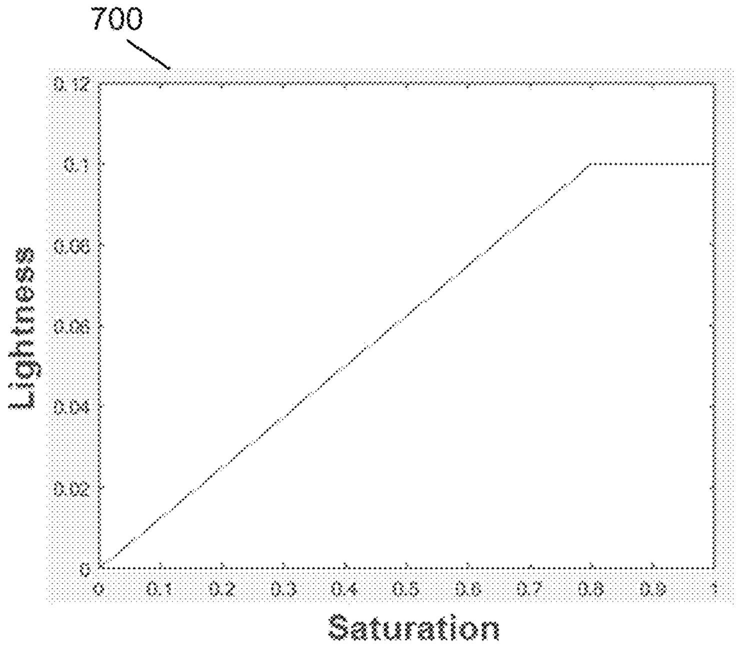
FIG. 7 illustrates a graph of lightness weighting according to saturation, according to some embodiments.
FIG. 8 illustrates an example of pseudocode for an algorithm/process for adjustment of Lab (L: lightness, a: red and green value, b: blue and yellow value) color space channels, according to some embodiments.

FIG. 6 illustrates an example of lightness weighting according to saturation, according to some embodiments. As previously mentioned, according to the PP effect, perceptual brightness increases with saturation. Thus, the lightness of high saturated pixels can be reduced without perceptually changing the image and at the same time, saving power. In some embodiments, the system reduces the lightness as shown in the curve in graph 700 (FIG. 7). This Radial Weighting Function models the curve as shown in FIG. 7. If the saturation is above 80%, then the lightness is reduced by 0.1. If the saturation is lesser than 80%, the lightness reduction is gradual.

FIG. 7 illustrates a graph of lightness weighting according to saturation, according to some embodiments. According to PP effect, perceptual brightness increases with saturation. Hence, the processing of FIG. 3 can reduce the lightness of high saturated pixels without perceptually changing the image and at the same time, saving power. In this processing portion, the system can reduce the lightness as shown in the curve in graph 700. Any type of linear or non-linear curve can be used in this step, for example, cosine, exponentially increasing, etc. In one or more embodiments, the lightness adjustment function takes in the saturation value and outputs the lightness reduction value as follows:

light_factor2=lightness_adjust2(Saturation)

where light_factor2 belongs in [0, 0.1]

FIG. 8 illustrates an example of pseudocode for an algorithm/process for adjustment of Lab (L: lightness, a: red and green value, b: blue and yellow value) color space channels, according to some embodiments. Obtaining all the factors from the previous processing of FIG. 3, the Lab channels are changed as follows:

total_light_factor now has information based on both hue (light_factor1) and saturation (light_factor2).

Multiplying sat_factor to a and b can increase the chroma and in-turn, can increase the saturation (according to the equations provided above). In one or more embodiments, clipping can be performed to limit the values in the valid ab range.

Figure 9:
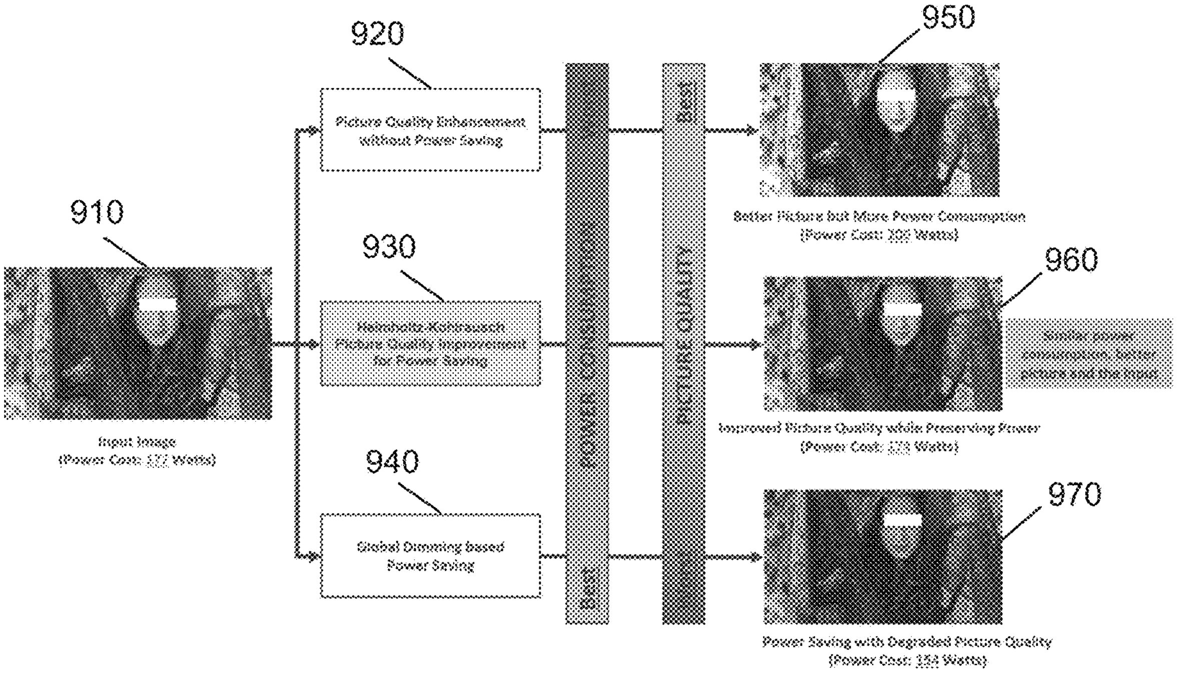
FIG. 9 illustrates an example of the disclosed technology use for improvement of picture quality with similar power consumption, according to some embodiments.

FIG. 9 illustrates an example of the disclosed technology use for improvement of picture quality with similar power consumption, according to some embodiments. The disclosed technology can be used for displays (e.g., televisions, smart phones, wearable devices, tablets, laptops, automotive displays, VR displays, AR displays, headset displays, digital cameras and camcorders, medical device displays, etc.) to show better picture quality with more perceptible details and contrast without increasing power consumption. As shown for comparison, the input picture (image) 910 (with example power cost of 177 Watts) is shown as being input to either picture quality enhancement without power saving 920, PP effect PQ improvement for power saving 930 related to one or more embodiments, or global dimming based power saving 940. The vertical rectangle for power consumption shows more consumption to less consumption (top to bottom). The vertical rectangle for picture quality shows best quality to worst quality (top to bottom). Image 950 shows a better picture quality but usage of more power consumption (example power cost of 200 Watts). Image 960 shows an improved picture quality while saving power consumption (example power cost of 174 Watts). Image 960 has a similar power usage as input picture 910 with a better picture quality. The image 970 shows power usage saving with a degraded picture quality (example power cost of 154 Watts). By judiciously changing saturation of hues, the disclosed technology can be used for displays to show better picture quality with vivid colors without increasing power consumption.

Figure 10:
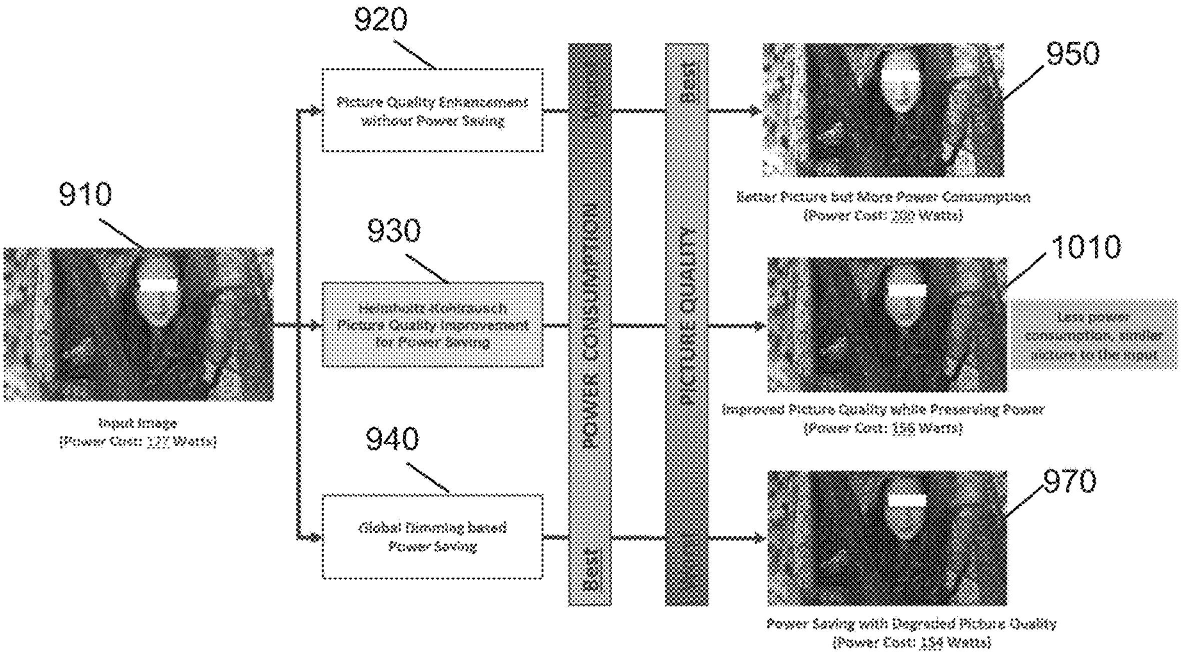
FIG. 10 illustrates an example of the disclosed technology use for preserving picture quality with less power consumption, according to some embodiments.

FIG. 10 illustrates an example of the disclosed technology use for preserving picture quality with less power consumption, according to some embodiments. The disclosed technology can be used for displays (e.g., televisions, smart phones, wearable devices, tablets, laptops, automotive displays, VR displays, AR displays, headset displays, digital cameras and camcorders, medical device displays, etc.) to save power with limited picture quality degradation. As shown for comparison, the input picture (image) 910 (with example power cost of 177 Watts) is shown as being input to either picture quality enhancement without power saving 920, PP effect PQ improvement for power saving 930 related to one or more embodiments, or global dimming based power saving 940. The vertical rectangle for power consumption shows more consumption to less consumption (top to bottom). The vertical rectangle for picture quality shows best quality to worst quality (top to bottom). Image 950 shows a better picture quality but usage of more power consumption (example power cost of 200 Watts). Image 910 shows preserved picture quality while saving power consumption (example power cost of 156 Watts). Image 910 uses less power, but the picture quality is similar to as image 1010. Image 970 shows power usage saving with a degraded picture quality (example power cost of 154 Watts). By adjusting lightness of specific pixels, the disclosed technology can be used for displays to save power with limited picture quality degradation.

Figure 11:
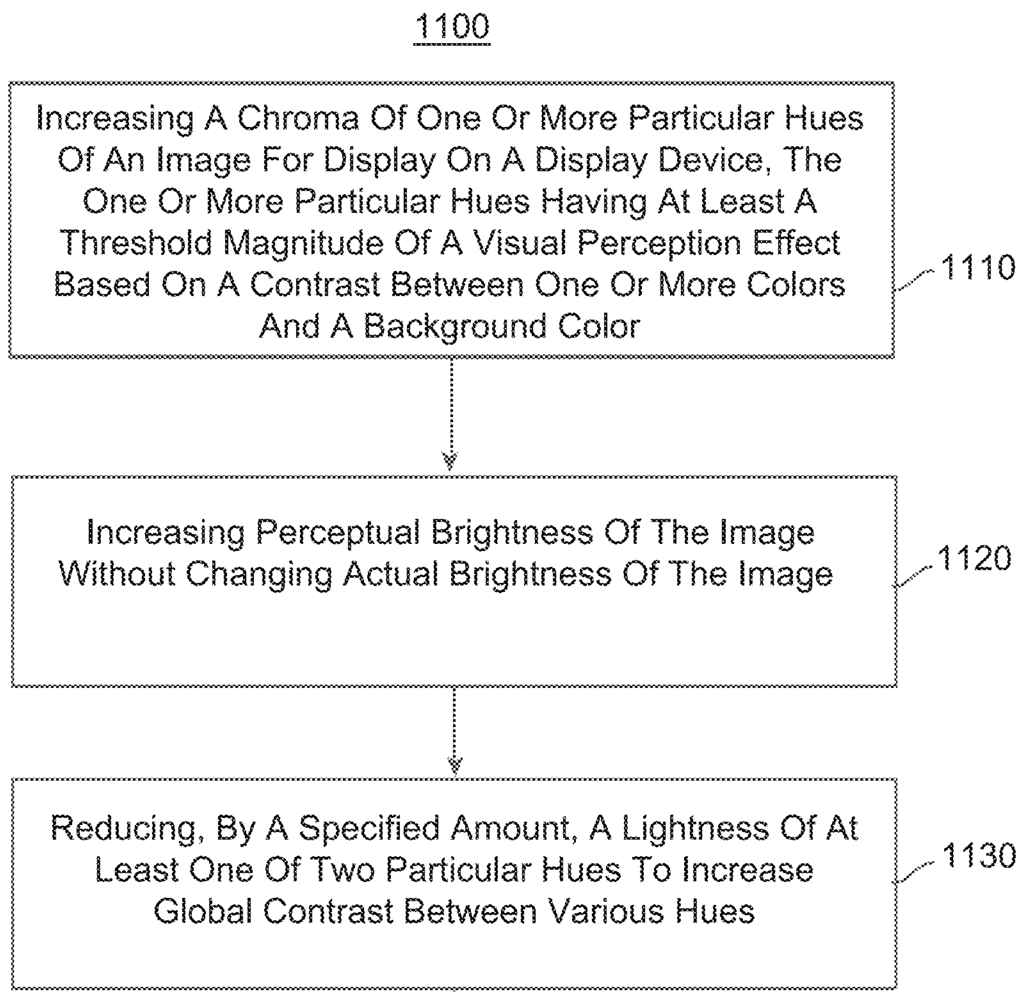
FIG. 11 illustrates a process for providing increasing global contrast between various hues, according to some embodiments.

FIG. 11 illustrates a (computing) process 1100 for providing increasing global contrast between various hues, according to some embodiments In block 1110, process 1100 increases a chroma of one or more particular hues of an image (e.g., video images, streamed images, etc.) for display on a display device (e.g., televisions, smart phones, wearable devices, tablets, laptops, automotive displays, VR displays, AR displays, headset displays, digital cameras and camcorders, medical device displays, etc.). The one or more particular hues have at least a threshold magnitude of a visual perception (e.g., PP) effect based on a contrast between one or more colors and a background color. In block 1120, process 1100 performs increasing perceptual brightness of the image without changing actual brightness of the image. In block 1130, process 1100 reduces, by a specified amount, a lightness of at least one of two particular hues to increase global contrast between various hues.

In some embodiments, process 1100 further includes the feature that the two particular hues to increase the global contrast are red and yellow.

In one or more embodiments, process 1100 additionally includes the feature that the visual perception effect is an HK effect.

In some embodiments, process 1100 provides the feature that the one or more particular hues have at least the threshold magnitude of an HK effect that include at least one of magenta, violet or blue.

In one or more embodiments, process 1100 additionally includes the feature that one or more radial weighting functions are used to adjust saturation and lightness of the image based on at least one of hue or the saturation.

In some embodiments, process 1100 further includes the feature of reducing a lightness of determined high-saturated colors to save power consumption of the display device.

In one or more embodiments, process 1100 additionally includes the feature that picture quality for the display device is improved at a same time power consumption is preserved or reduced.

One or more embodiments provide a computing processing model of a PP (e.g., an HK effect, etc.) effect for perceived color improvement while preserving or reducing power consumption, which includes use of a radial weighting function that adjusts saturation and lightness of an image based on hue and saturation. Some embodiments provide a radial weighting function for colors to enhance the perceived color of the input content based on the PP effect to improve the picture quality and preserve/reduce power consumption. One or more embodiments provide a computing processing model of the PP effect based on point processing and at least one of increasing chroma of hues but leaving red and yellow unchanged, reducing lightness of red and yellow by a small amount, or reducing lightness of high saturated colors. Some embodiments provide a computing processing model of the PP effect that is hardware efficient as it does not require convolution filtering and just needs individual pixel processing.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:

increasing a chroma of one or more particular hues of an image for display on a display device, the one or more particular hues having at least a threshold magnitude of a visual perception effect based on a contrast between one or more colors and a background color;

increasing perceptual brightness of the image without changing actual brightness of the image; and reducing, by a specified amount, a lightness of at least one of two particular hues to increase global contrast between various hues;

wherein one or more radial weighting functions are used to adjust saturation and lightness of the image.

2. The method of claim 1, wherein the two particular hues to increase the global contrast are red and yellow.

3. The method of claim 1, wherein the visual perception effect is a Helmholtz-Kohlrausch (HK) effect.

4. The method of claim 3, wherein the one or more particular hues having at least the threshold magnitude of HK effect include at least one of magenta, violet or blue.

5. The method of claim 1, wherein the one or more radial weighting functions are based on at least one of hue or the saturation.

6. The method of claim 1, wherein reducing the lightness of the at least one of two particular hues saves power consumption of the display device.

7. The method of claim 1, wherein picture quality for the display device is improved at a same time power consumption is preserved or reduced.

8. A non-transitory processor-readable medium that includes a program that when executed by a processor provides increasing global contrast between various hues, comprising:

increasing, by the processor, a chroma of one or more particular hues of an image for display on a display device, the one or more particular hues having at least a threshold magnitude of a visual perception effect based on a contrast between one or more colors and a background color;

increasing, by the processor, perceptual brightness of the image without changing actual brightness of the image; and reducing, by the processor, by a specified amount, a lightness of at least one of two particular hues to increase global contrast between various hues;

wherein one or more radial weighting functions are used to adjust saturation and lightness of the image.

9. The non-transitory processor-readable medium of claim 8, wherein the two particular hues to increase the global contrast are red and yellow.

10. The non-transitory processor-readable medium of claim 8, wherein the visual perception effect is a Helmholtz-Kohlrausch (HK) effect.

11. The non-transitory processor-readable medium of claim 10, wherein the one or more particular hues having at least the threshold magnitude of HK effect include at least one of magenta, violet or blue.

12. The non-transitory processor-readable medium of claim 8, wherein the one or more radial weighting functions are based on at least one of hue or the saturation.

13. The non-transitory processor-readable medium of claim 8, wherein reducing the lightness of the at least one of two particular hues saves power consumption of the display device.

14. The non-transitory processor-readable medium of claim 8, wherein picture quality for the display device is improved at a same time power consumption is preserved or reduced.

15. An apparatus comprising:

a memory storing instructions; and at least one processor executes the instructions including a process configured to:

increase a chroma of one or more particular hues of an image for display on a display device, the one or more particular hues having at least a threshold magnitude of a visual perception effect based on a contrast between one or more colors and a background color;

increase perceptual brightness of the image without changing actual brightness of the image; and reduce, by a specified amount, a lightness of at least one of two particular hues to increase global contrast between various hues;

wherein one or more radial weighting functions are used to adjust saturation and lightness of the image.

16. The apparatus of claim 15, wherein the two particular hues to increase the global contrast are red and yellow.

17. The apparatus of claim 15, wherein the visual perception effect is a Helmholtz-Kohlrausch (HK) effect.

18. The apparatus of claim 17, wherein the one or more particular hues having at least the threshold magnitude of HK effect include at least one of magenta, violet or blue.

19. The apparatus of claim 15, wherein the one or more radial weighting functions are based on at least one of hue or the saturation.

20. The apparatus of claim 15, wherein:

reducing a lightness of the at least one of two particular hues saves power consumption of the display device; and picture quality for the display device is improved at a same time power consumption is preserved or reduced.

* * * * *